Apr. 3, 1923. 1,450,459.
C. E. SMITH.
PORTABLE ROTARY SAW.
FILED MAY 17, 1921.
2 SHEETS—SHEET 2.
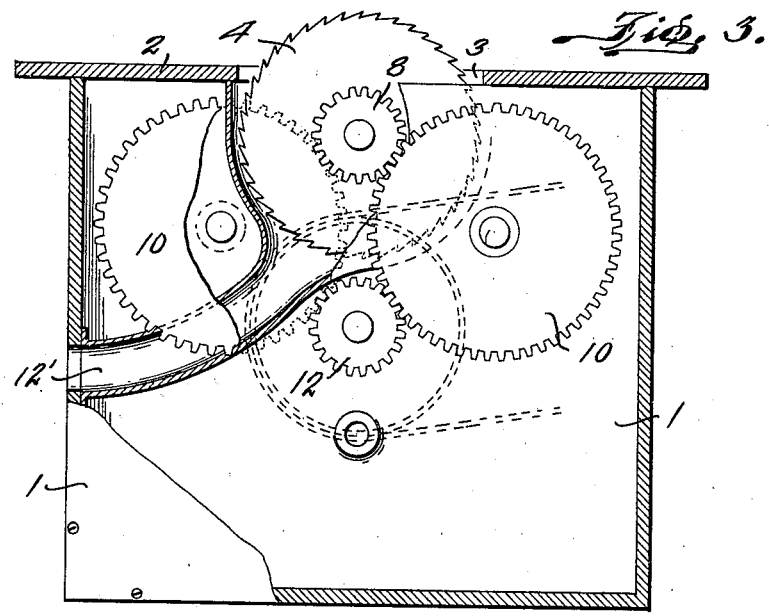
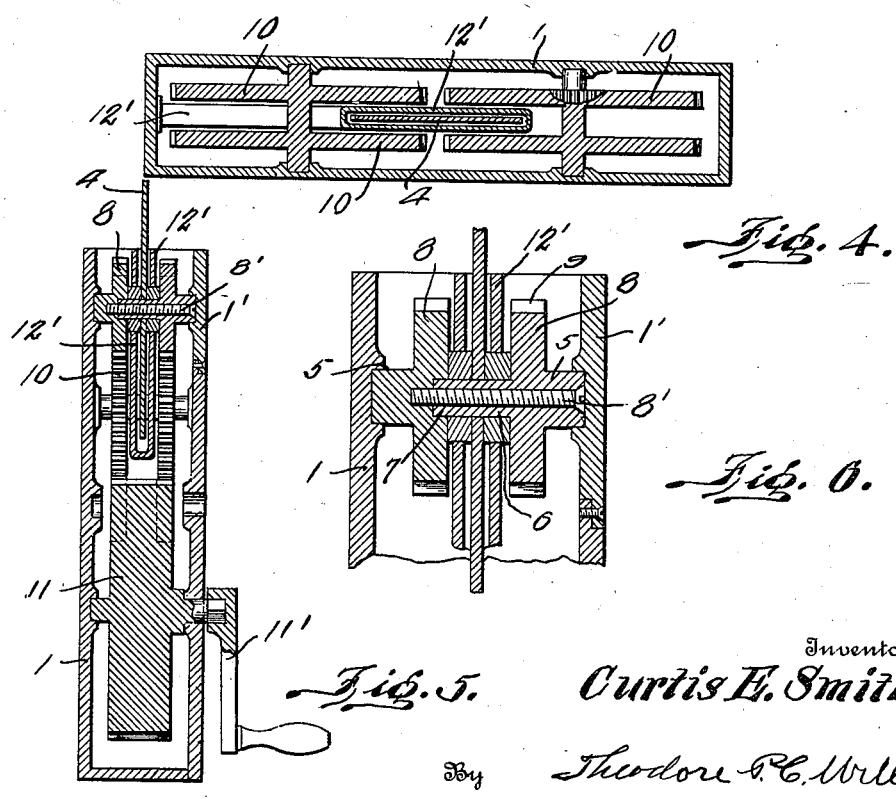
Inventor
Curtis E. Smith
By Theodore P. C. Willis
Attorney Patented Apr. 3, 1923.

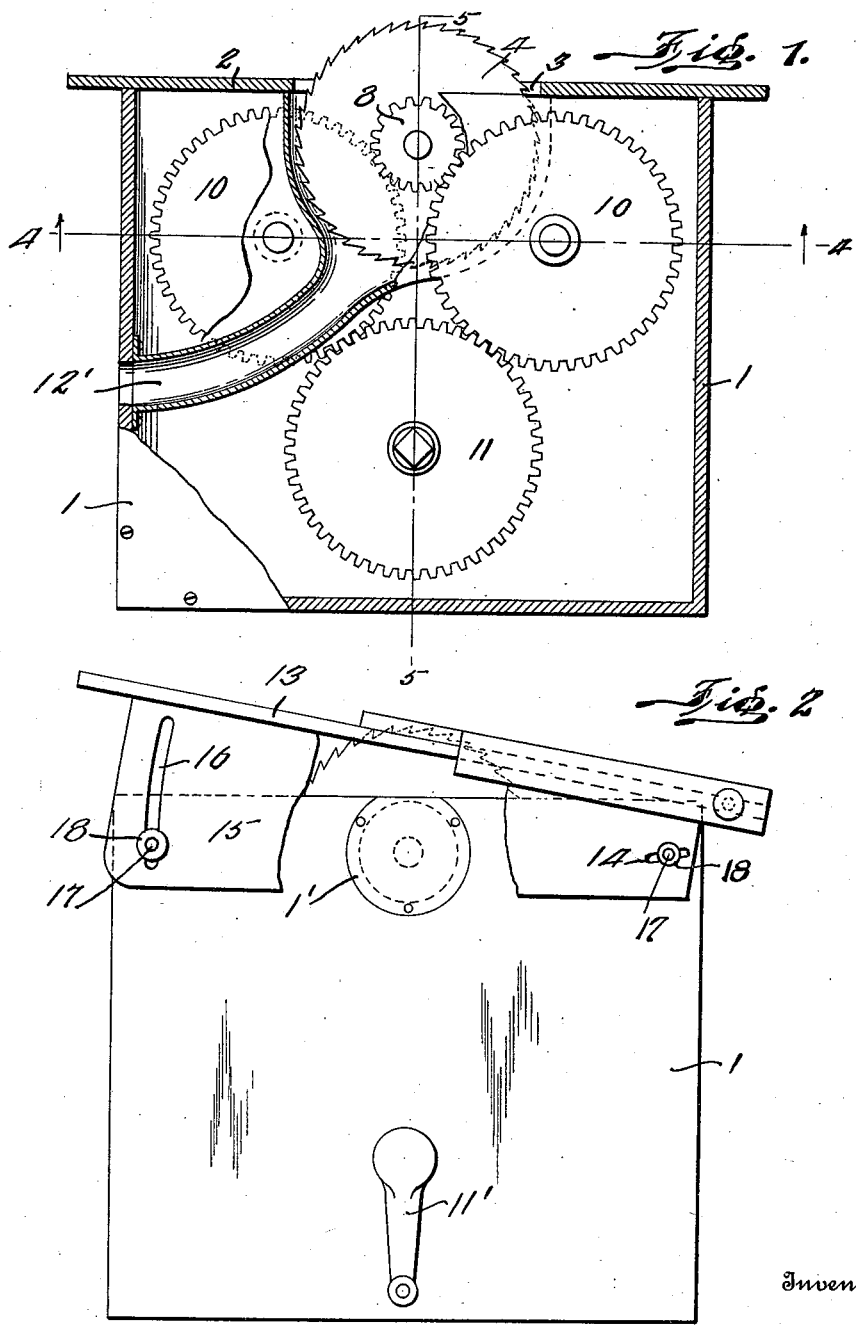

1,450,459

UNITED STATES PATENT OFFICE.

CURTIS E. SMITH, OF ST. JOSEPH, MISSOURI.

PORTABLE ROTARY SAW.

Application filed May 17, 1921. Serial No. 470,333.

*To all whom it may concern:*

Be it known that I, CURTIS E. SMITH, a citizen of the United States, residing at St. Joseph, in the county of Buchanan and State of Missouri, have invented certain new and useful Improvements in Portable Rotary Saws, of which the following is a specification.

This invention relates to improvements in portable rotary saws and has for its objects construction of such a saw that can be easily carried from place to place and operated under most any condition or position, either vertical, horizontal or at an angle to the vertical. Because of its compactness, the device can be operated in limited amount of space.

Another object of this invention is to provide a saw of this type which has parts that are easily constructed, readily assembled or taken apart, and when assembled form a compact and efficient saw structure.

Still another object of this invention is to provide a portable saw that is more or less completely inclosed in the casing which shields the operator from contact with the operating gear and protects him from danger and risk of being injured by inadvertently contacting any part of his body with the saw teeth.

These and other objects and advantages will appear from the following description taken in connection with the accompanying drawings which show a preferred embodiment of my device. I do not wish, however, to be limited by the particular structure here shown but only by the scope of the appended claims.

Figure 1 is a sectional view of my device showing a hand driving gear for operating the saw.

Fig. 2 is the side elevation of the saw casing showing adjustable work supporting table or bed partly in section in order to show the removable saw supporting section of the casing.

Fig. 3 is a view similar to Fig. 1 but showing the power operated driving mechanism for the saw.

Fig. 4 is a horizontal section on line 4—4 of Fig. 1.

Fig. 5 is a vertical section on line 5—5 of Fig. 1.

Fig. 6 is a cross section through the saw and the removable saw supporting section of the casing.

In the drawings the reference numeral 1 represents a casing rectangular in shape forming a housing in which the saw and saw operating means are located and protected. The parts of the housing, which consist of two ends, a bottom and two sides, may be joined together in any suitable manner, and it is preferred that one side at least may be readily detachable so access may be had to the gearing for cleaning, repair, replacement, or any other necessary purposes. On top of the box, or casing, 1 is a bed plate 2, having therein near the center a slot 3, through which a saw 4 projects and in which it rotates. As shown in Fig. 6 the saw is supported in the housing by one side of the housing and by a detachable supporting section 1' suitably fitting within cutout portion in the other side of the housing. In the detachable supporting section and the side of the housing are bearings in which the saw trunnions 5 rotate. The trunnions carrying the saw are composed of two parts, one of which has a projection 6 serving as a mandrel upon which the saw is securely held and projecting into the cavity 7 in the other part of the trunnion. These two parts of the trunnions are held together by any suitable means, preferably by means of a screw 8'. On each of the trunnions on each side of the saw there is a gear wheel 8 for operating the saw. Between each of the gear wheels 8 and the saw is a bushing 9 for holding the saw firmly in position and preventing wabbling. These gear wheels 8 mesh with and are operated by other gear wheels 10 suitably mounted in bearing on each side of the housing by means of trunnions fitting in suitable bearings as seen from Figs. 4 and 5. These gear wheels 10 are double in construction and have a common axle whereby they rotate in unison. Each part of the double gear engages one of the gears on the saw, the saw rotating in the cavity between the gears.

From an examination of Fig. 5 it may be seen that each part of these double gear wheels will engage one of the gear wheels of the saw, giving to the saw upon rotation a uniform rotary motion due to the power being equally applied to both sides of the saw. For the purpose of operating the saw through these last mentioned gear wheels, I have provided both a hand operated gear 11 and a power operated gear 12 which may be selectively used, and for which separate bearings are provided, as shown in Fig. 5. My hand operated gear is shown in Fig. 1 while the power operated gear is shown in Fig. 3, both of which are substantially similarly located with regard to the gear wheels 10 and meshing with both of them. For rotating the hand operated gear I provide a handle 11'. By this means rotation of either one of my operating gears transmits a rotary movement to the intermediate gears and from the intermediate gears to the saw. Owing to the fact that my intermediate gears are double in their nature, it is necessary to make my operating gears wide enough to engage both parts of the intermediate gears.

In order to prevent the saw dust from getting in contact with the gear wheels and filling the casing, I have provided a saw dust hopper and chute 12' for conveying the saw dust out of the box as shown in Figs. 1 and 3. As is seen in Fig. 5 the saw dust hopper fits in between gear wheels 8 and the saw.

For convenience in the operation of my device, and to give it a wider range of usefulness, I have provided a movable bed for my saw casing which is pivotally connected at one end to the casing by means of studs on the casing projecting through narrow slots 14 in side members 15, as shown in Fig. 2. The forward part of the bed is adapted to be locked in an adjusted position relative to the top by means of studs 17 secured to the opposite sides of the casing, and operating in elongated slots 16. Nuts 18 on the stud 17 are adapted to be screwed up tight for locking the bed plate in any one of its adjusted positions.

The gears are rigidly mounted on all the axles, and are rotated with the axles, and by reason of the great number of gears, some of which run in opposite directions to intermeshing gears, all friction will be relieved and a smooth running device will be the result.

The size of the gears depends upon the speed and the size of the saw blade desired.

The casing 1 may be located in any position, so that it is possible to operate the saw and produce a cut in any position of the casing. A saw of this kind is especially adapted to be inverted for cutting boards out of a floor.

Having thus fully described my invention, what I claim as new and desire to secure by Letters Patent, is—

1. In a portable saw, a casing, a pair of spaced gears having integrally formed and laterally projecting bosses seated in bearings in the opposite side walls of the casing, an integrally formed sleeve projecting centrally of the inner face of one gear with its end seated within a centrally disposed socket in the inner face of the other gear, means rigidly binding the gears together, a circular saw mounted on the sleeve and spaced midway between the gears by bushings and a plurality of gears, with pairs of said gears meshing with the first-named gears, and means for rotating the gears for causing rotation of the saw.

2. In a portable saw, a casing, a pair of spaced gears having integrally formed and laterally projecting bosses seated in bearings in the opposite side walls of the casing, an integrally formed sleeve projecting centrally of the inner face of one gear with its end seated within a centrally disposed socket in the inner face of the other gear, means rigidly binding the gears together, a circular saw mounted on the sleeve and spaced midway between the gears by bushings, said saw having a portion of its periphery projected through a slot in the top of the casing, pairs of spaced gears meshing with the first-named gears and having the periphery of one gear of a pair spaced from the periphery of a gear of the other pair with the saw embraced between the pairs of gears, and means for rotating the pairs of gears in opposite directions thereby rotating the first-named gears and the saws.

3. In a portable saw, a casing, a pair of spaced gears having integrally formed and laterally projecting bosses seated in bearings in the opposite side walls of the casing, an integrally formed sleeve projecting centrally of the inner face of one gear with its end seated within a centrally disposed socket in the inner face of the other gear, means rigidly binding the gears together, a circular saw mounted on the sleeve and spaced midway between the gears by bushings, pairs of spaced gears located upon opposite sides of the axis of the rigidly connected gears and meshing with said gears and a single gear in mesh with the pairs of spaced gears, and means for rotating the last-mentioned gear.

4. In a portable saw, a casing, a pair of spaced gears having integrally formed and laterally projecting bosses seated in bearings in the opposite side walls of the casing, an integrally formed sleeve projecting centrally of the inner face of one gear with its end seated within a centrally disposed socket in the inner face of the other gear, means rigidly binding the gears together, a circular saw mounted on the sleeve and spaced midway between the gears by bushings, a single gear of sufficient thickness and diameter to mesh with the pairs of spaced gears, and means for rotating the last-mentioned gear.

In testimony whereof I affix my signature.

CURTIS E. SMITH.